US011693445B2

(12) United States Patent
Cavallaro

(10) Patent No.: US 11,693,445 B2
(45) Date of Patent: Jul. 4, 2023

(54) ELECTRONIC SYSTEM, CORRESPONDING METHOD OF OPERATION AND ELECTRONIC DEVICE

(71) Applicant: STMicroelectronics S.r.l., Agrate Brianza (IT)

(72) Inventor: Giuseppe Cavallaro, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 17/112,853

(22) Filed: Dec. 4, 2020

(65) Prior Publication Data

US 2021/0181783 A1 Jun. 17, 2021

(30) Foreign Application Priority Data

Dec. 5, 2019 (IT) .................. 102019000023091

(51) Int. Cl.
*G06F 1/08* (2006.01)
*G06F 1/10* (2006.01)
*H04L 12/40* (2006.01)

(52) U.S. Cl.
CPC .............. *G06F 1/08* (2013.01); *G06F 1/10* (2013.01); *H04L 12/40032* (2013.01)

(58) Field of Classification Search
CPC ......... G06F 1/08; G06F 1/10; H04L 12/40032
See application file for complete search history.

(56) References Cited

U.S. PATENT DOCUMENTS

| 5,892,926 | A | * | 4/1999 | Witkowski | .......... G06F 13/4269 710/100 |
| 2004/0085910 | A1 | | 5/2004 | Wang | |
| 2005/0013319 | A1 | | 1/2005 | Kenkare | |
| 2008/0052533 | A1 | * | 2/2008 | Iida | ..................... H04L 12/4641 713/153 |
| 2010/0083026 | A1 | | 4/2010 | Millet et al. | |

OTHER PUBLICATIONS

Cisco, MAC Address Filter Manager, 5 pages (Year: 2016).*
Wikipedia, IEEE 802.3 definition, retrieved from the internet at <https://en.wikipedia.org/wiki/IEEE_802.3> (Year: 2017).*

(Continued)

*Primary Examiner* — Stefan Stoynov
(74) *Attorney, Agent, or Firm* — Slater Matsil, LLP

(57) ABSTRACT

An embodiment electronic system comprises a first device, a second device and a clock generator circuit. The clock generator circuit is configured to provide a clock signal having a selectable frequency. The first device comprises a first processing circuit having coupled therewith a first Ethernet interface, and the second electronic device comprises a second processing circuit having coupled therewith a second Ethernet interface. At least one of the first device and the second device is configured to determine a frequency of the clock signal as a function of an operating parameter of the first device and/or of the second device and/or as a function of a parameter of the frames exchanged between the first device and the second device, and to act on the clock generator circuit to operate the clock generator circuit at the frequency.

20 Claims, 3 Drawing Sheets

(56) References Cited

OTHER PUBLICATIONS

Deng, Hong-De et al., "The Data Transmission System Design between Intelligent Multi-serial Port and Ethernet Based on ARM and FPGA", Second International Conference on Instrumentation, Measurement, Computer, Communication and Control, Dec. 8-10, 2012, DOI: 10.1109/IMCCC.2012.47, 4 pages.

Gang, Wang et al., "Design of Multiprocessor Parallel SystemBase on Switched Ethernet", 8th International Conference on Electronic Measurement and Instruments, Aug. 16-18, 2007, DOI: 10.1109/ICEMI.2007.4350897, 4 pages.

Ke, Zhang et al., "Design of a network-processor-based intelligent secure IAD", International Conference on Information and Automation, Jun. 20-23, 2008, DOI: 10.1109/ICINFA.2008.4608096, 4 pages.

Tomljenovic, Davor et al., "Performance Analysis of Protocol Stack for Inter-Processor Ethernet Communication in Automotive Industry", Zooming Innovation in Consumer Technologies Conference (ZINC), May 30-31, 2018, DOI: 10.1109/ZINC.2018.8448733, 4 pages.

Yongchao, Tao et al., "A real-time communication platform based on processor separation and virtual machine technology", 2nd International Symposium on Instrumentation and Measurement, Sensor Network and Automation (IMSNA), Dec. 23-24, 2013, DOI: 10.1109/IMSNA.2013.6743233, 4 pages.

\* cited by examiner

ELECTRONIC SYSTEM, CORRESPONDING METHOD OF OPERATION AND ELECTRONIC DEVICE

CROSS-REFERENCE TO RELATED APPLICATIONS

This application claims the benefit of Italian Application No. 102019000023091, filed on Dec. 5, 2019, which application is hereby incorporated herein by reference.

TECHNICAL FIELD

The description relates to electronic communication techniques. One or more embodiments may be applied to inter-processor communication, e.g., in the automotive field.

BACKGROUND

Inter-processor communication may relate to communication (i.e., exchange of signals to transmit and/or receive data) between two or more processing circuits such as micro-controllers and/or micro-processors comprised in a processing system. Thus, inter-processor communication may involve exchange of digital signals (i.e., signals encoded according to a certain communication protocol).

In the automotive field, inter-processor communication may relate mostly to communication between micro-controllers (also referred to as micro-controller units, MCU).

Automotive micro-controllers usually comprise dedicated hardware for managing inter-processor communication. For example, Zipwire is a known technology for communicating between two devices (such as two micro-controllers) over a serial interface. Zipwire is implemented using a Serial Inter-Processor Interface (SIPI) over a LVDS Fast Asynchronous Serial Transmission (LFAST) interface. A SIPI module controls the higher level protocol of the interface, and the LFAST controls the physical interface. The normal communication mode for the Zipwire is 320 Mbit/s.

The Zipwire interface comprises five signals:
a pair of LVDS transmits pins,
a pair of LVDS receive pins, and
a clock.

Typically, if two micro-controllers are connected via Zipwire, any micro-controller can be defined as the master device and the other defined as the slave device. The clock is unidirectional and is defined to be an output on the slave node and an input on the master node.

The Zipwire protocol is based on a frame format that includes synchronization information at the beginning of the frame. Data within the frame is synchronous.

The application layer of Zipwire is implemented in the SIPI. The application layer runs on top of the LFAST physical communication interface and has its own protocol. The main purpose of the SIPI is to provide the framework to exchange information and to provide the link between one micro-controller and another micro-controller or a peripheral device through the LFAST physical communication interface.

SIPI also adds error detection features such as CRC, acknowledge, and timeout. The LFAST protocol may not include any error detection/correction scheme by itself.

SUMMARY

Micro-controllers (e.g., for use in the automotive field) may not be provided with a LFAST interface, or—if present—such a LFAST interface may be subject to malfunctioning and/or failure.

Therefore, an object of one or more embodiments is to provide a solution for implementing inter-processor communication which may not rely on use of a LFAST interface.

One or more embodiments may involve the (re)use of hardware modules which are present on micro-controllers, and may not rely on interfaces specifically dedicated to (or adapted for) inter-processor communication.

One or more embodiments may facilitate inter-processor communication at high speed, e.g., up to 200 Mbit/s.

One or more embodiments may facilitate increasing the power efficiency of inter-processor communication.

According to one or more embodiments, such an object can be achieved by means of an electronic system having the features set forth in the claims that follow.

One or more embodiments may relate to a corresponding method of operation.

One or more embodiments may relate to a corresponding electronic device.

The claims are an integral part of the technical teaching provided herein in respect of the embodiments.

In one or more embodiments, an electronic system may comprise a first electronic device, a second electronic device and a clock generator circuit. The clock generator circuit may be configured to provide a clock signal having a selectable frequency. The first electronic device may comprise a first processing circuit having coupled therewith a first Ethernet interface, and the second electronic device may comprise a second processing circuit having coupled therewith a second Ethernet interface. The first Ethernet interface may be directly connected to the second Ethernet interface for exchanging frames between the first device and the second device, with a set of output data pins of the first Ethernet interface coupled to a set of homologous input data pins of the second Ethernet interface, and a set of output data pins of the second Ethernet interface coupled to a set of homologous input data pins of the first Ethernet interface. The first Ethernet interface and the second Ethernet interface may comprise respective input clock pins coupled to the clock generator circuit to receive therefrom the clock signal having a selectable frequency. At least one of the first electronic device and the second electronic device may be configured to:
determine a frequency of the clock signal as a function of at least one operating parameter of the first electronic device and/or of the second electronic device, and/or as a function of at least one parameter of the frames exchanged between the first electronic device and the second electronic device, and
act on the clock generator circuit to operate the clock generator circuit at the frequency.

BRIEF DESCRIPTION OF THE DRAWINGS

One or more embodiments will now be described, by way of example only, with reference to the annexed figures, wherein.

DETAILED DESCRIPTION OF ILLUSTRATIVE EMBODIMENTS

Figure 1:
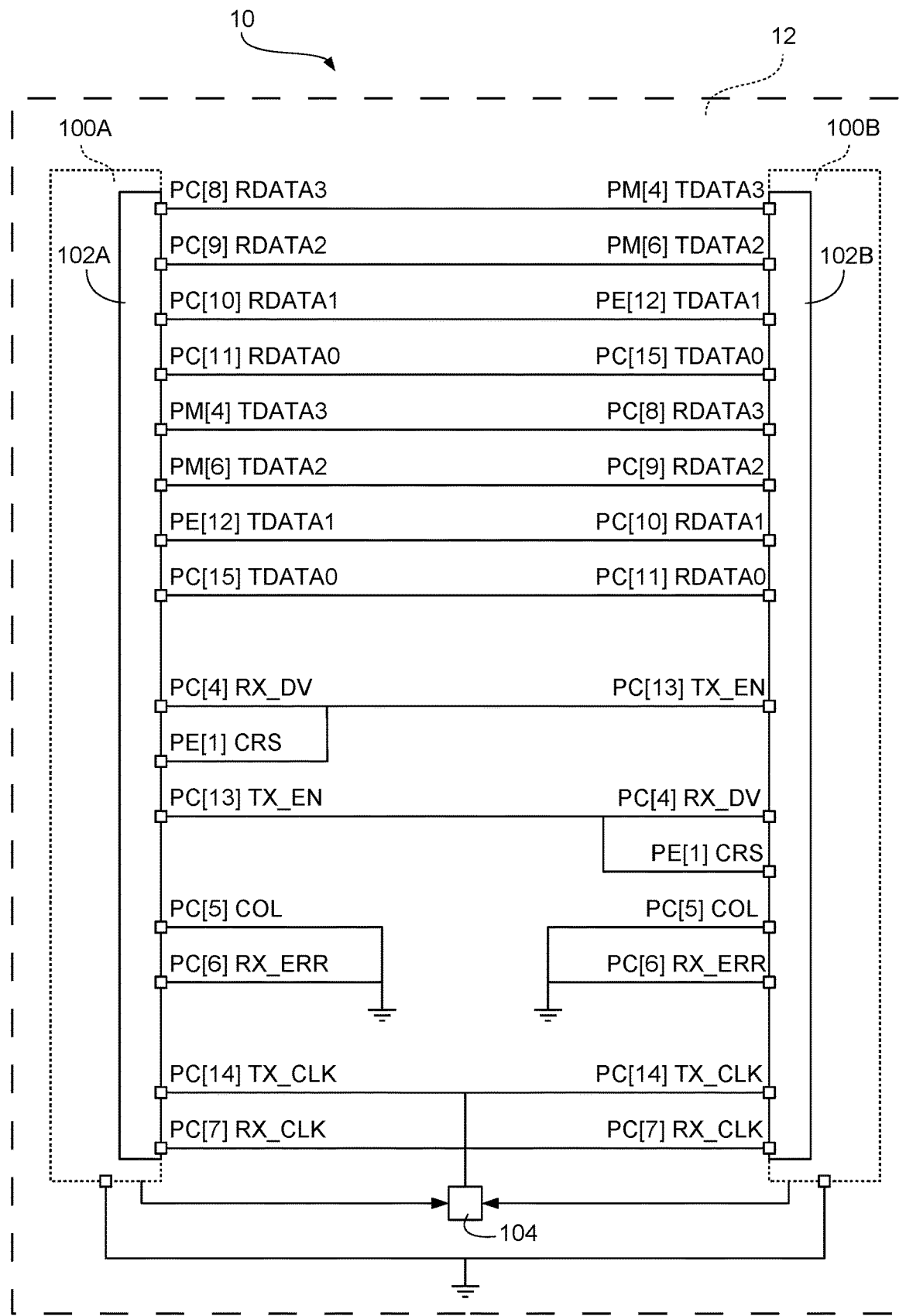
FIG. 1 is a circuit block diagram exemplary of one or more embodiments.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

Throughout the figures annexed herein, like parts or elements are indicated with like references/numerals and a corresponding description will not be repeated for brevity.

The references used herein are provided merely for convenience and hence do not define the extent of protection or the scope of the embodiments.

By way of introduction to the detailed description of exemplary embodiments, one may first refer to the following documents, which are exemplary of possible approaches to the issue of inter-processor communication:

[1] "*Design of Multiprocessor Parallel SystemBase on Switched Ethernet*", Wang Gang et al., 2007 8th International Conference on Electronic Measurement and Instruments, 16-18 Aug. 2007, DOI: 10.1109/ICEMI.2007.4350897;

[2] "*Performance Analysis of Protocol Stack for Inter-Processor Ethernet Communication in Automotive Industry*", Davor Tomljenovic et al., 2018 Zooming Innovation in Consumer Technologies Conference (ZINC), 30-31 May 2018, DOI: 10.1109/ZINC.2018.8448733;

[3] "*The Data Transmission System Design between Intelligent Multi-serial Port and Ethernet Based on ARM and FPGA*", Deng Hong-De et al., 2012 Second International Conference on Instrumentation, Measurement, Computer, Communication and Control, 8-10 Dec. 2012, DOI: 10.1109/IMCCC.2012.47;

[4] "*A real-time communication platform based on processor separation and virtual machine technology*", Tao Yongchao et al., 2013 2nd International Symposium on Instrumentation and Measurement, Sensor Network and Automation (IMSNA), 23-24 Dec. 2013, DOI: 10.1109/IMSNA.2013.6743233; and

[5] "*Design of a network-processor-based intelligent secure IAD*", Zhang Ke et al., 2008 International Conference on Information and Automation, 20-23 Jun. 2008, DOI: 10.1109/ICINFA.2008.4608096.

It is noted that Ethernet communication (e.g., according to the IEEE 802.3 standard and subsequent modifications) may be used for inter-processor communication.

Connection between Ethernet interfaces (with or without the use of Ethernet switches therebetween) may rely on Reverse Media-Independent Interface (RevMII) or other interfaces (e.g., Reduced Gigabit Media-Independent Interface, RGMII, or Turbo Media-Independent Interface, TMII). However, in these cases the communication speed may be fixed by the protocol.

Thus, it is noted that inter-processor communication may rely on different protocols and peripherals embedded in the processors. For instance, in the automotive field, such processors may be automotive micro-controllers, and inter-processor communication may rely on Deserial/Serial Peripheral Interface (DSPI) or Controller Area Network (CAN) bus.

The above-mentioned protocols and peripherals may not be suitable to provide satisfactory performance in terms of communication speed, e.g., up to 200 Mbit/s.

According to one or more embodiments, a micro-controller (e.g., for use in the automotive field) may comprise a first Ethernet interface and a second (optional) Ethernet interface. For instance, the devices available with companies of the group of companies of the Assignee under the trade designation "SPC58 H Line" (e.g., SPC58EHx or SPC58NHx) are exemplary of such a micro-controller.

In one or more embodiments, the first Ethernet interface may comprise, e.g., a Gigabit Ethernet interface.

In one or more embodiments, the second Ethernet interface may comprise, e.g., a 100M Ethernet interface.

The first Ethernet interface (or, generally, the Ethernet interface capable of providing higher communication speed) may conventionally be used for communication between the micro-controller and other devices or peripherals external to the processing system (e.g., Gigabit Ethernet physical layer—PHY—transceivers and/or layer-2 switches).

In a processing system comprising a plurality of micro-controllers, a possible solution for implementing inter-processor communication may rely on the use of the first Ethernet interfaces of the micro-controllers with at least one Ethernet switch therebetween. This solution may also apply to those cases where the micro-controllers comprise one Ethernet interface only.

In one or more embodiments, two micro-controllers in a same processing system may be coupled (e.g., directly connected or wired one to the other) by means of their respective second Ethernet interfaces to implement inter-processor communication. Such a coupling may not rely on the use of any transceiver between the coupled Ethernet interfaces (e.g., a sort of MAC2MAC connection may be implemented).

For instance, FIG. 1 is exemplary of a possible coupling between a first micro-controller 100A and a second micro-controller 100B in a processing system 10. For instance, the micro-controllers 100A and 100B may be provided (e.g., mounted) on a same printed circuit board (PCB) 12.

As exemplified in FIG. 1, in one or more embodiments the data lines may be coupled (e.g., directly connected or wired) between two respective Ethernet interfaces 102A, 102B comprised in the micro-controllers 100A, 100B.

For instance, one or more transmit data lines of the first Ethernet interface 102A (e.g., PM[4]TDATA3, PM[6] TDATA2, PE[12]TDATA1, PC[15]TDATA0) may be (directly) connected to one or more receive data lines (e.g., homologous or corresponding) of the second Ethernet interface 102B (e.g., PC[8]RDATA3, PC[9]RDATA2, PC[10] RDATA1, PC[11]RDATA0). Similarly, one or more transmit data lines of the second Ethernet interface 102B may be (directly) connected to one or more receive data lines (e.g., homologous or corresponding) of the first Ethernet interface 102A.

In one or more embodiments, a receive data valid line (e.g., PC[4]RX_DV) of the first Ethernet interface 102A may be (directly) connected to a data transmit enable line (e.g., PC[13]TX_EN) of the second Ethernet interface 102B. Similarly, a receive data valid line of the second Ethernet interface 102B may be (directly) connected to a data transmit enable line of the first Ethernet interface 102A.

In one or more embodiments, a collision signal (e.g., PC[5]COL) and a receive error signal (e.g., PC[6]RX_ERR) of the first and/or second Ethernet interfaces 102A, 102B may be connected to ground.

In one or more embodiments, an (optional) transmit error signal may be absent from the design.

In one or more embodiments, a transmit clock signal (e.g., PC[14]TX_CLK) and a receive clock signal (e.g., PC[7] RX_CLK) of the first and/or second Ethernet interface 102A, 102B may be input signals, and may be (directly) connected to a main clock generator circuit 104. The main clock generator 104 may be, for instance, an external oscillator or a more complex circuit configured to provide a clock signal having a selectable frequency (e.g., 2.5 MHz, 25 MHz or 50 MHz).

In one or more embodiments, (directly) coupling micro-controllers by means of respective second Ethernet interfaces provided therein may advantageously leave the respective first Ethernet interfaces (e.g., Gigabit Ethernet interfaces) available for coupling the micro-controllers to other devices external to the processing system.

It is noted that using a media-independent interface (MII) mode for inter-processor communication may involve a clock frequency of 25 MHz in order to provide a communication speed of about 100 Mbit/s.

It is also noted that the desired inter-processor communication speed may not be constant over time. Therefore, the maximum throughput may be reduced or incremented, depending on the desired speed, by tuning (e.g., adjusting) the clock frequency. As a result, power efficiency of inter-processor communication may be increased, e.g., insofar as the clock frequency may be reduced (e.g., down to 2.5 MHz) if the desired communication speed is low and the throughput of the communication line is reduced.

In one or more embodiments, an algorithm (e.g., a software algorithm running on a micro-controller) designed according to the application requirements may be used to determine a preferred clock frequency of the inter-processor communication as a function of the desired communication speed.

For instance, the clock frequency may be dynamically tuned (e.g., increased, "over-clocked") to provide fast inter-processor communication. As an example, if a theoretical communication speed of about 100 Mbit/s is obtainable when the clock frequency is 25 MHz, a theoretical communication speed of about 200 Mbit/s may be targeted by increasing the clock frequency to about 50 MHz.

Figure 2:
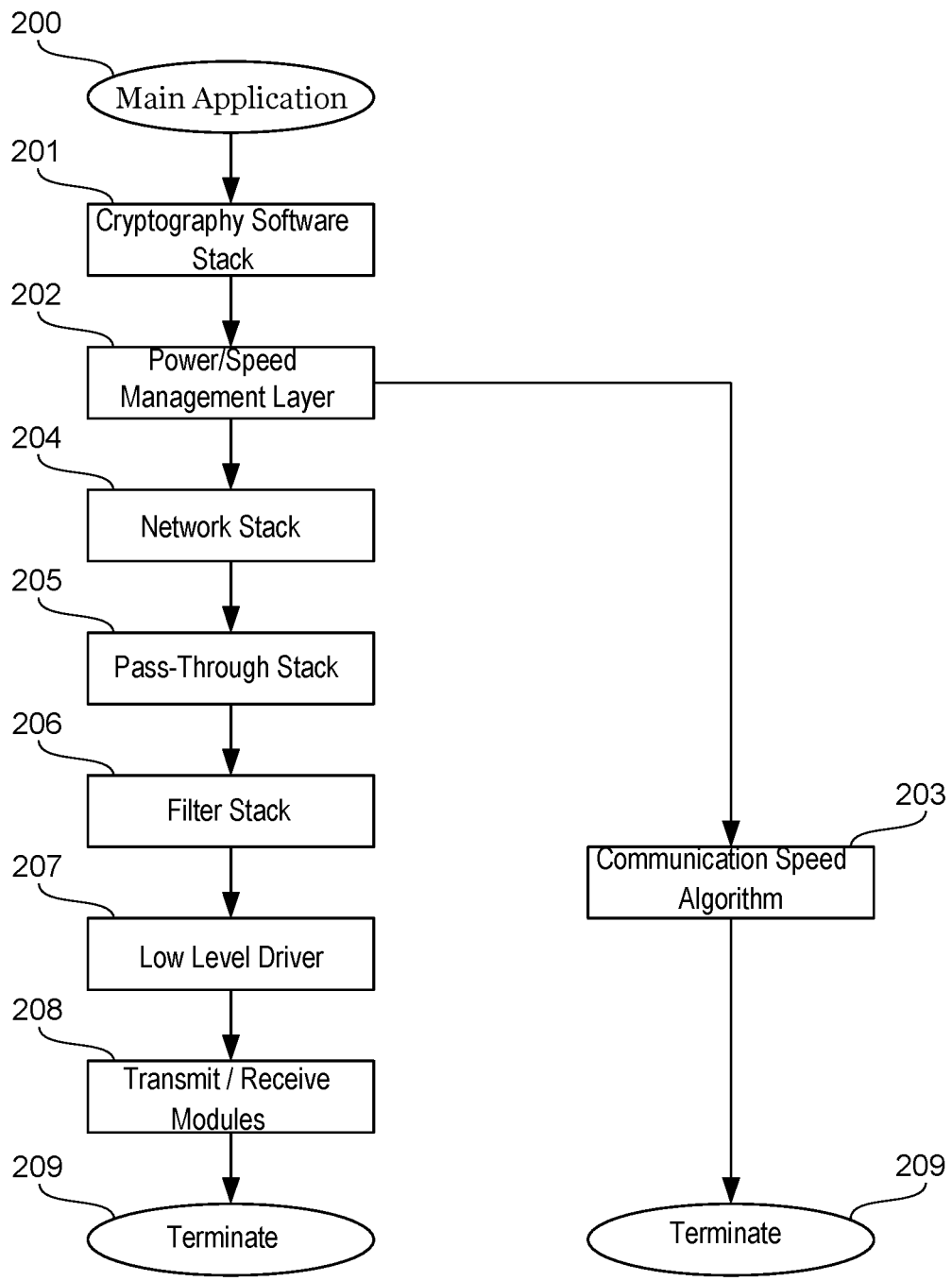
FIG. 2 is a block diagram exemplary of a procedure in one or more embodiments.

FIG. 2 is a block diagram exemplary of a possible procedure or operating flow for implementing inter-processor communication in one or more embodiments.

In one or more embodiments, a "main" application or function 200 may run on a micro-controller (e.g., the micro-controller 100A and/or 100B). Execution of the main function 200 may comprise configuring the micro-controller and configuring a high-level application intended for generating and/or processing data.

For instance, the main application 200 running on a first micro-controller 100A may generate data which are intended for transmission to a second micro-controller 100B via a "direct" Ethernet connection as described with reference to FIG. 1.

The main application 200 may be designed to support inter-processor communication covering different type of requests. For instance, the main function may enable or disable (possibly, also at run-time) at least part of the stacks which implement the inter-processor communication. For instance, the main function may switch on/off the Ethernet interfaces or may stop tasks that implement the communication, or any related services.

In one or more embodiments, before transmitting a frame to the second micro-controller 100B, the frame data or the whole payload of the egress packet generated by the first micro-controller 100A may optionally be subject to encryption. Therefore, the main application 200 may be configured to invoke (or call) a cryptography software stack 201 that provides the related security services.

In one or more embodiments (e.g., in automotive micro-controllers) the secure keys may be saved in dedicated sectors of an embedded hardware device (e.g., a FLASH device) that can be (only) accessed by a dedicated co-processor, referred to as hardware security module (HSM). The firmware running on the hardware security module may be used by the cryptography software stack 201 to access the secure keys as well. Therefore, in one or more embodiments a hardware security module may be used to encrypt the payload of a frame to be sent over the inter-processor communication line, in order to secure (in hardware) the payload of the Ethernet frames passed between the two micro-controllers.

In one or more embodiments, micro-controllers implementing inter-processor communication via (direct) Ethernet coupling may thus comprise secure features to increase the security ("to armor") of communication. Such security features may be implemented by reusing HSM hardware which may be already available on automotive microcontrollers.

Additionally, the procedure exemplified in FIG. 2 may comprise invoking (or calling) a power/speed management layer 202. The power/speed management layer 202 may tune the speed of the inter-processor communication, e.g., in order to save power by reducing the communication speed (i.e., the MII clock frequency) or to increase the communication speed (which may result in a higher power consumption).

Figure 3:
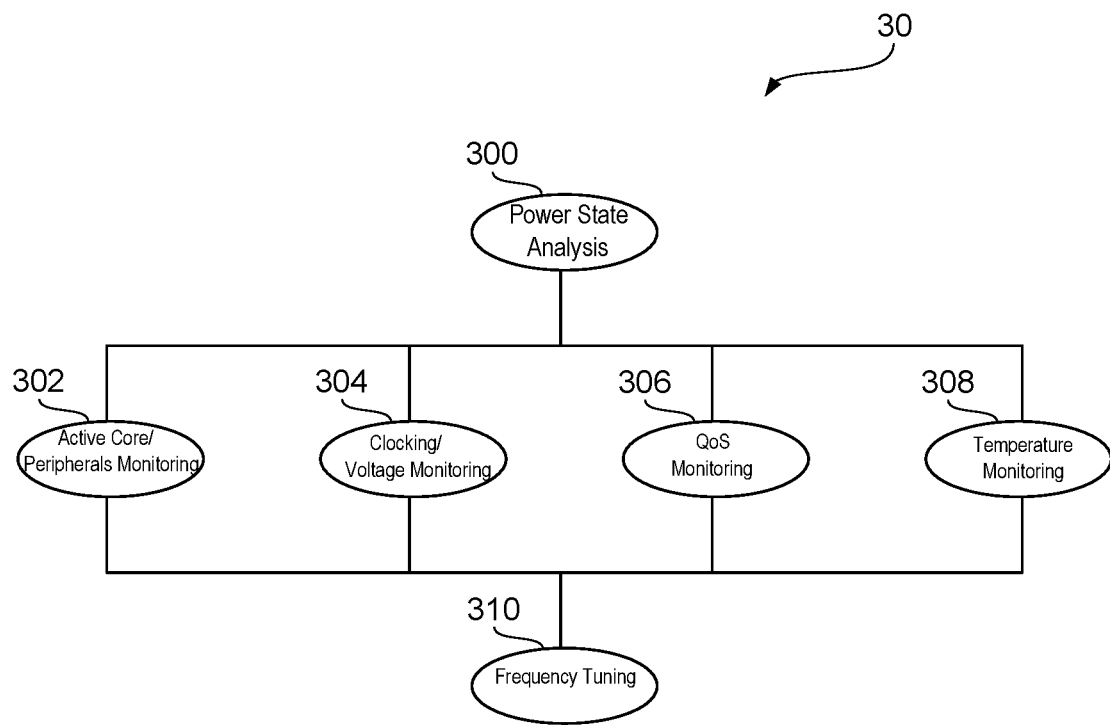
FIG. 3 is a block diagram exemplary of a finite state machine for use in one or more embodiments.

The power/speed management layer 202 may thus involve an algorithm 203 (e.g., implemented by a finite state machine as exemplified in FIG. 3) which may determine the communication speed as a function of various parameters such as, for instance, the number of enabled peripherals connected to the system, the clock settings, and global system constraints. Therefore, in one or more embodiments the communication speed may be selected to be static or dynamic by using a dedicated state machine.

Generally, detailed power states may be defined in each micro-controller datasheet. According to defined user-case, the communication speed (e.g., the MII clock frequency) can be maintained below a certain threshold to limit the power consumption of the micro-controller, or to balance satisfactory Ethernet performance (e.g., in terms of communication speed) for the running scenario.

In one or more embodiments, an algorithm for determining the communication speed may take into consideration the network traffic properties to better tune the communication speed. For instance, the communication speed may be determined as a function of:

the size of the frame(s) (e.g., by comparing the size to one or more thresholds), insofar as longer frames may involve a higher communication speed;

the possible presence of priority tagged frames, which may involve an increment of the throughput and thus of the communication speed;

the possible presence of frames referring to a particular protocol (e.g., a diagnostic targeted frame may involve lower performance of the communication link, while a burst of frames such as TCP or UDP frames—which transfers data between the memories of the two micro-controllers—may involve higher throughput).

Additionally or alternatively, the tuning of the communication speed may depend on other factors. For instance, the software stack (e.g., the power/speed management layer 202) may increase or decrease the frequency as a function of the number of frames transmitted per second, and/or as a function of CPU usage. For example, if the CPU usage is low and high priority frames have to be transferred, a high communication speed (e.g., the maximum speed) may be selected. If a condition of low traffic is detected, a low communication speed (e.g., the minimum speed) may be selected. Generally, the frequency may be adjusted as a function of certain power efficiency metrics, and/or as a function of statistics about the amount of data sent or received in a certain time interval.

In one or more embodiments, a dedicated task of the main application 200 may be scheduled periodically in order to adjust the communication speed to the current operating conditions of the micro-controllers 100A, 100B and/or of the communication link therebetween. Such dedicated task may poll information about interrupts, number of frames and average of CPU usage to tune the communication speed. By way of example, if the application is transferring high priority frames with a payload longer than a certain threshold, an increment of the communication speed may be triggered.

In one or more embodiments, the algorithm may be customized considering a variety of different cases as exemplified above. A simple speed selection may just involve two speed levels, corresponding to minimum and maximum frequency selection. The choice between the minimum and maximum frequency may be adopted as a result of one of the constraints above being met.

For instance, FIG. 3 illustrates a non-limiting example of a simple finite state machine 30 which may be implemented to tune the frequency of the communication between the micro-controllers 100A, 100B. In such exemplary embodiment, the finite state machine 30 comprises:
- a power state analysis stage 300,
- an active core and peripherals monitoring stage 302,
- a clocking/voltage monitoring stage 304,
- a network traffic Quality of Service (QoS) monitoring stage 306,
- a temperature monitoring stage 308, and
- a frequency tuning stage 310 (e.g., increasing or decreasing the frequency).

In one or more embodiments, more than two frequency values may be selectable depending on various parameters, i.e., a higher "granularity" of the frequency selection may be provided. Additionally, in one or more embodiments, frequencies higher than 50 MHz may be selectable.

One or more embodiments may thus provide the possibility of switching the frequency of the clock signal (e.g., the MII clock signal) at runtime, independently from the granularity of the frequency selection itself.

In the procedure exemplified in FIG. 2, a network stack 204 may call the low layers after configuring the related glue logic around the Ethernet controller. The network stack 204 may also check the integrity of the egress packet (e.g., checksum calculation may be performed in case the Ethernet controller does not embed any checksum offloading engine). Therefore, in one or more embodiments the network stack 204 may be configured to "encapsulate" the data generated by the main application and optionally encrypted into an Ethernet frame (e.g., based on the TCP protocol or UDP protocol).

Optionally, the procedure exemplified in FIG. 2 may comprise setting up a pass-through stack 205. The pass-through stack 205 may be configured to transmit the Ethernet frame output by the network stack 204 to a further Ethernet interface (i.e., an Ethernet interface different from the one dedicated to inter-processor communication), e.g., in order for the Ethernet frame to be available (e.g., to be pushed) externally to the micro-controller. In one or more embodiments, the Ethernet frame being provided externally to the micro-controller via a further Ethernet interface may be useful for debugging purposes. In one or more embodiments, only selected frames may be provided externally to the micro-controller.

In the procedure exemplified in FIG. 2, a filter stack 206 may be called to process the Ethernet frames in order to facilitate filtering of the frames. For instance, the MAC address of the frame may be changed by the filter stack 206, and/or the frame may be tagged, e.g., by applying a VLAN tag thereto.

Therefore, in one or more embodiments the communication may drop (e.g., ignore) the frames that do not have valid tags and/or expected MAC addresses, thereby providing an additional level of security. One or more embodiments may thus provide increased robustness against malicious software aiming at transferring corrupted data packets between the micro-controllers, with such unauthorized transfer which may fail due to the Ethernet filtering levels.

Additionally, a frame failing to provide a valid MAC address and/or a valid VLAN ID may also be detected by the cryptography software stack 201 that might not be able to associate any valid cryptographic key as a result of the MAC address or VLAN ID being not valid.

In the procedure exemplified in FIG. 2, a low level driver 207 may be configured (e.g., delegated) to pass the Ethernet frame to a hardware Ethernet controller in the micro-controller. A dedicated software device driver may be provided to program the embedded Ethernet transmit and receive modules.

In one or more embodiments, the transmit and receive modules 208 may be managed by using respective DMA engines. In this case, a set of descriptors may be programmed (e.g., comprising commands and the data to be transferred).

In one or more embodiments, the main application 200 may terminate at an exit step 209.

At the receiver side (i.e., at receiver micro-controller 100B that is coupled to the sender micro-controller 100A), the reception process may be managed by interrupts corresponding to the reception of an incoming frame. The incoming frame may be passed to the upper layers to be manipulated (e.g., to remove encryption of the payload and/or to detect a particular tag in the frame).

Generally, in one or more embodiments both transmission and reception processes may be managed by using dedicated software tasks called on demand when a frame need to be transmitted, and by interrupt service routine on ingress packets.

Additionally or alternatively, the reception process may be managed by running a server application on the processing circuit, the server service (or application) being configured to (continuously) listen for incoming frames. The transmission process may be managed by invoking a client service (or application) upon request at the transmitter side.

In one or more embodiments, a frame received at (e.g., passed from) the first Ethernet interface of a micro-controller (e.g., a Gigabit Ethernet interface) may be optionally passed onto the second Ethernet interface dedicated to inter-processor communication. Therefore, a frame received from the external world (e.g., from a peripheral device connected to a first micro-controller via a Gigabit Ethernet interface) may be passed to a second micro-controller using the secondary Ethernet interface.

It will be appreciated that, while an algorithm for tuning (e.g., adjusting) the communication speed has been described herein with reference to micro-controllers comprising a first and a second Ethernet interface, wherein the second Ethernet interface is configured for inter-processor communication, the algorithm may be used in general in one or more embodiments where micro-controllers may comprise a single Ethernet interface.

One or more embodiments may facilitate inter-processor communication speed close to 100 Mbit/s (e.g., 98 Mbit/s) at a frequency of 25 MHz, and close to 200 Mbit/s (e.g., 197 Mbit/s) at a frequency of 50 MHz.

Therefore, one or more embodiments may provide inter-processor communication by (re)using hardware modules which are present in micro-controllers, and may not rely on the use of interfaces specifically dedicated to inter-processor communication and/or the use of network switches external to the micro-controllers. As a result, one or more embodiments may be more cost-effective than the known solutions.

One or more embodiments may reduce power consumption by dynamically tuning the communication speed as a function of the desired throughput.

One or more embodiments may provide secure features such as inter-processor message filtering and protection.

In the present description, reference has been made mainly to "micro-controllers" in an electronic processing system. It will be noted that one or more embodiments may apply, in general, to any kind of processing devices comprised in a certain processing system, wherein the processing devices are provided with means for realizing inter-device communication.

As exemplified herein, an electronic system (e.g., 10) may comprise a first electronic device (e.g., 100A), a second electronic device (e.g., 100B) and a clock generator circuit (e.g., 104). The first and second electronic devices may comprise a pair of micro-controller units for use in a vehicle, e.g., mounted on a printed circuit board (e.g., 12). The clock generator circuit may be configured to provide a clock signal having a selectable frequency. The first electronic device may comprise a first processing circuit having coupled therewith a first Ethernet interface, and the second electronic device may comprise a second processing circuit having coupled therewith a second Ethernet interface.

As exemplified herein, the first Ethernet interface may be directly connected to the second Ethernet interface for exchanging frames between the first electronic device and the second electronic device, with a set of output data pins (e.g., PM[4]TDATA3, PM[6]TDATA2, PE[12]TDATA1, PC[15]TDATA0) of the first Ethernet interface coupled to a set of homologous input data pins (e.g., PC[8]RDATA3, PC[9]RDATA2, PC[10]RDATA1, PC[11]RDATA0) of the second Ethernet interface, and a set of output data pins (e.g., PM[4]TDATA3, PM[6]TDATA2, PE[12]TDATA1, PC[15]TDATA0) of the second Ethernet interface coupled to a set of homologous input data pins (e.g., PC[8]RDATA3, PC[9]RDATA2, PC[10]RDATA1, PC[11]RDATA0) of the first Ethernet interface (102A). The first Ethernet interface and the second Ethernet interface may comprise respective input clock pins (e.g., PC[14]TX_CLK, PC[7]RX_CLK) coupled to the clock generator circuit to receive therefrom the clock signal having a selectable frequency.

In the context of the present description, "homologous" pins should be interpreted as "corresponding" pins, i.e. pins having a functional relation (e.g., an output pin of the first device having a functionally corresponding input pin of the second device, and vice-versa).

As exemplified herein, at least one of the first electronic device and the second electronic device may be configured to:
 determine (e.g., 203) a frequency of the clock signal as a function of at least one operating parameter of the first electronic device and/or of the second electronic device, and/or as a function of at least one parameter of the frames exchanged between the first electronic device and the second electronic device, and
 act on the clock generator circuit to operate the clock generator circuit at the frequency.

As exemplified herein, the first Ethernet interface and the second Ethernet interface may comprise pairs of control pins (e.g., PC[4]RX_DV, PC[13]TX_EN), each pair comprising:
 an output control pin (e.g., PC[13]TX_EN) configured to control data transmission from an output data pin of the first Ethernet interface, respectively the second Ethernet interface, towards a homologous input data pin of the second Ethernet interface, respectively the first Ethernet interface, and
 an input control pin (e.g., PC[4]RX_DV) configured to control data reception at the homologous input data pin of the second Ethernet interface, respectively the first Ethernet interface.

As exemplified herein, the first Ethernet interface and the second Ethernet interface may comprise a Media-independent interface, MII.

As exemplified herein, the at least one operating parameter of the first electronic device and/or of the second electronic device may comprise at least one of:
 a number of peripherals (e.g., enabled peripherals) connected to the first electronic device and/or to the second electronic device, and
 an amount of usage of the respective processing circuit (e.g., CPU usage) of the first electronic device and/or of the second electronic device.

As exemplified herein, the at least one parameter of the frames exchanged between the first electronic device and the second electronic device may comprise at least one of:
 a length of the exchanged frames,
 an amount of frames exchanged per second,
 a tag comprised in the exchanged frames (e.g., a VLAN tag), and
 a type of exchanged frames (e.g., TCP or UDP frames).

As exemplified herein, at least one of the first electronic device and the second electronic device may be configured to determine (e.g., 203) the frequency of the clock signal periodically.

As exemplified herein, at least one of the first electronic device and the second electronic device may be configured to filter (e.g., 206) the exchanged frames as a function of a tag value and/or a MAC address comprised in the exchanged frames. Filtering may comprise discarding frames having an incorrect tag value and/or MAC address (e.g., unrecognized, not included in a list of correct values).

As exemplified herein, at least one of the first electronic device and the second electronic device may comprise a hardware security module configured for applying cryptographic processing to the exchanged frames (e.g., encrypting the data intended for transmission through the Ethernet interface, and decrypting encrypted data received at the Ethernet interface).

As exemplified herein, at least one of the first electronic device and the second electronic device may comprise a further Ethernet interface couplable to external devices for receiving data therefrom and/or transmitting data thereto. The at least one of the first electronic device and the second electronic device may be configured to transmit (e.g., 205) selected frames through the further Ethernet interface.

As exemplified herein, the clock generator circuit may be configured to generate the clock signal having a frequency selectable between 2.5 MHz and 50 MHz.

As exemplified herein, a method of operating an electronic system may comprise:
  exchanging frames between a first electronic device and a second electronic device,
  determining a frequency of a clock signal as a function of at least one operating parameter of the first electronic device and/or of the second electronic device, and/or as a function of at least one parameter of the frames exchanged between the first electronic device and the second electronic device, and
  acting on a clock generator circuit to operate the clock generator circuit at the frequency.

Without prejudice to the underlying principles, the details and embodiments may vary, even significantly, with respect to what has been described by way of example only, without departing from the extent of protection.

The extent of protection is defined by the annexed claims.

What is claimed is:

1. An electronic system comprising:
    a first electronic device;
    a second electronic device; and
    a clock generator circuit configured to provide a clock signal having a selectable frequency;
    wherein the first electronic device comprises a first processing circuit having coupled therewith a first Ethernet interface and the second electronic device comprises a second processing circuit having coupled therewith a second Ethernet interface;
    wherein the first Ethernet interface is directly connected to the second Ethernet interface for exchanging frames between the first electronic device and the second electronic device, with a set of output data pins of the first Ethernet interface coupled to a set of homologous input data pins of the second Ethernet interface, and a set of output data pins of the second Ethernet interface coupled to a set of homologous input data pins of the first Ethernet interface;
    wherein the first Ethernet interface and the second Ethernet interface comprise respective input clock pins coupled to the clock generator circuit to receive therefrom the clock signal having the selectable frequency;
    wherein the first Ethernet interface and the second Ethernet interface comprise respective receive error pins coupled to ground without utilizing transmit error signals; and
    wherein at least one of the first electronic device and the second electronic device is configured to:
      select a frequency of the clock signal as a function of at least one operating parameter of the first electronic device and/or of the second electronic device, and/or as a function of at least one parameter of the frames exchanged between the first electronic device and the second electronic device; and
      act on the clock generator circuit to operate the clock generator circuit at the selected frequency.

2. The electronic system of claim 1, wherein the first Ethernet interface and the second Ethernet interface comprise pairs of control pins, each pair of control pins comprising:
    an output control pin configured to control data transmission from an output data pin of the first Ethernet interface, respectively the second Ethernet interface, towards a homologous input data pin of the second Ethernet interface, respectively the first Ethernet interface; and
    an input control pin configured to control data reception at the homologous input data pin of the second Ethernet interface, respectively the first Ethernet interface.

3. The electronic system of claim 1, wherein the first Ethernet interface and the second Ethernet interface comprise a media-independent interface (MII).

4. The electronic system of claim 1, wherein the at least one operating parameter of the first electronic device and/or of the second electronic device comprises at least one of:
    a number of peripherals connected to the first electronic device and/or to the second electronic device; or
    an amount of usage of the respective processing circuit of the first electronic device and/or of the second electronic device.

5. The electronic system of claim 1, wherein the at least one parameter of the frames exchanged between the first electronic device and the second electronic device comprises at least one of:
    a length of the exchanged frames;
    an amount of frames exchanged per second;
    a tag contained in the exchanged frames; or
    a type of the exchanged frames.

6. The electronic system of claim 1, wherein at least one of the first electronic device and the second electronic device is configured to select the frequency of the clock signal periodically.

7. The electronic system of claim 1, wherein at least one of the first electronic device and the second electronic device is configured to filter the exchanged frames as a function of a tag value and/or a MAC address contained in the exchanged frames, and wherein the filtering comprises discarding frames having an incorrect tag value and/or MAC address.

8. The electronic system of claim 1, wherein at least one of the first electronic device and the second electronic device comprises a hardware security module configured to apply cryptographic processing to the exchanged frames.

9. The electronic system of claim 1, wherein at least one of the first electronic device and the second electronic device comprises a further Ethernet interface couplable to external devices for receiving data therefrom and/or transmitting data thereto, wherein the at least one of the first electronic device and the second electronic device is configured to transmit selected frames through the further Ethernet interface.

10. The electronic system of claim 1, wherein the selectable frequency is between 2.5 MHz and 50 MHz.

11. A method of operating an electronic system comprising a first electronic device comprising a first processing circuit coupled to a first Ethernet interface; a second electronic device comprising a second processing circuit coupled to a second Ethernet interface; and a clock generator circuit, the first Ethernet interface being directly connected to the second Ethernet interface for exchanging frames between the first electronic device and the second electronic device, a set of output data pins of the first Ethernet interface being coupled to a set of homologous input data pins of the second Ethernet interface, and a set of output data pins of the second Ethernet interface being coupled to a set of homologous input data pins of the first Ethernet interface, the method comprising:

generating, by the clock generator circuit, a clock signal having a selectable frequency;

receiving, by respective input clock pins of the first Ethernet interface and the second Ethernet interface, from the clock generator circuit, the clock signal having the selectable frequency;

exchanging frames between the first electronic device and the second electronic device via the first and second Ethernet interfaces, respectively, without utilizing receive error or transmit error signals;

selecting a frequency of the clock signal used by the first and second Ethernet interfaces as a function of at least one operating parameter of the first electronic device and/or of the second electronic device, and/or as a function of at least one parameter of the frames exchanged between the first electronic device and the second electronic device; and acting on the clock generator circuit to operate the clock generator circuit at the selected frequency.

12. The method of claim 11, further comprising:

controlling, by an output control pin of one of the Ethernet interfaces, data transmission from an output data pin of the one Ethernet interface, towards a homologous input data pin of the other Ethernet interface; and controlling, by an input control pin of the one Ethernet interface, data reception at the homologous input data pin of the other Ethernet interface.

13. The method of claim 11, wherein the first Ethernet interface and the second Ethernet interface operate as media-independent interfaces (MIIs).

14. The method of claim 11, wherein the at least one operating parameter of the first electronic device and/or of the second electronic device comprises at least one of:

a number of peripherals connected to the first electronic device and/or to the second electronic device; or an amount of usage of the respective processing circuit of the first electronic device and/or of the second electronic device.

15. The method of claim 11, wherein the at least one parameter of the frames exchanged between the first electronic device and the second electronic device comprises at least one of:

a length of the exchanged frames;

an amount of frames exchanged per second;

a tag contained in the exchanged frames; or a type of the exchanged frames.

16. The method of claim 11, further comprising periodically selecting, by at least one of the first electronic device and the second electronic device, the frequency of the clock signal.

17. The method of claim 11, further comprising filtering, by at least one of the first electronic device and the second electronic device, the exchanged frames as a function of a tag value and/or a MAC address contained in the exchanged frames, the filtering comprising discarding frames having an incorrect tag value and/or MAC address.

18. The method of claim 11, further comprising, applying, by a hardware security module of at least one of the first electronic device and the second electronic device, cryptographic processing to the exchanged frames.

19. The method of claim 11, further comprising receiving from and/or transmitting to an external device selected frames through a further Ethernet interface of at least one of the first electronic device and the second electronic device.

20. The method of claim 11, wherein the selectable frequency is between 2.5 MHz and 50 MHz.

* * * * *